US011575502B2

(12) United States Patent
Lee et al.

(10) Patent No.: US 11,575,502 B2
(45) Date of Patent: Feb. 7, 2023

(54) HOMOMORPHIC ENCRYPTION PROCESSING DEVICE, SYSTEM INCLUDING THE SAME AND METHOD OF PERFORMING HOMOMORPHIC ENCRYPTION PROCESSING

(71) Applicant: Samsung Electronics Co., Ltd., Suwon-si (KR)

(72) Inventors: Wijik Lee, Suwon-si (KR); Youngsik Moon, Hwaseong-si (KR); Hongrak Son, Anyang-si (KR); Jaehun Jang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 106 days.

(21) Appl. No.: 17/115,161

(22) Filed: Dec. 8, 2020

(65) Prior Publication Data

US 2021/0344479 A1   Nov. 4, 2021

(30) Foreign Application Priority Data

May 4, 2020   (KR) ........................ 10-2020-0053287

(51) Int. Cl.
*H04L 9/00* (2022.01)
*H04L 9/30* (2006.01)
(Continued)

(52) U.S. Cl.
CPC ................ *H04L 9/008* (2013.01); *H04L 9/14* (2013.01); *H04L 9/3093* (2013.01); *H04L 2209/24* (2013.01)

(58) Field of Classification Search
CPC ......... H04L 9/008; H04L 9/14; H04L 9/3093; H04L 9/30; H04L 2209/24; G06F 21/602;
(Continued)

(56) References Cited

U.S. PATENT DOCUMENTS 9,306,738 B2   4/2016   Loftus et al.
9,846,785 B2   12/2017  Bacon et al.
(Continued)

FOREIGN PATENT DOCUMENTS

KR   101449239 B1   10/2014
KR   101829267 B1   2/2018
KR   101861089 B1   5/2018

OTHER PUBLICATIONS

Security of homomorphic encryption, by Hao Chen et al., published 2017 (Year: 2017).*

(Continued)

*Primary Examiner* — Vu V Tran
(74) *Attorney, Agent, or Firm* — Harness, Dickey & Pierce, P.L.C.

(57) ABSTRACT

A homomorphic encryption processing device includes the processing circuitry is configured to generate ciphertext operation level information based on field information. The field information represents a technology field to which homomorphic encryption processing is applied. The ciphertext operation level information represents a maximum number of multiplication operations between homomorphic ciphertexts without a bootstrapping process. The processing circuitry is further configured to select and output a homomorphic encryption parameter based on the ciphertext operation level information. The processing circuitry is further configured to perform one of a homomorphic encryption, a homomorphic decryption and a homomorphic operation, based on the homomorphic encryption parameter. The homomorphic encryption processing device may adaptively generate a homomorphic encryption parameter according to a ciphertext operation level information determined based on a field information, and may perform a homomorphic
(Continued)

encryption, a homomorphic decryption and a homomorphic operation based on the homomorphic encryption parameter.

20 Claims, 14 Drawing Sheets

(51) Int. Cl.
*G06F 21/60* (2013.01)
*G06K 9/62* (2022.01)
*G06N 3/04* (2006.01)
*G06N 3/08* (2006.01)
*G06F 12/10* (2016.01)
*H04L 9/14* (2006.01)

(58) Field of Classification Search
CPC .... G06F 17/10; G06K 9/6277; G06N 3/0454; G06N 3/0472; G06N 3/08
See application file for complete search history.

(56) References Cited

U.S. PATENT DOCUMENTS

| | | | |
|---|---|---|---|
| 9,871,652 B2 | 1/2018 | Morikawa et al. | |
| 10,075,289 B2 | 9/2018 | Laine et al. | |
| 2013/0170640 A1* | 7/2013 | Gentry | H04L 9/008 380/30 |
| 2013/0191650 A1* | 7/2013 | Balakrishnan | G06F 21/6227 713/190 |
| 2013/0216044 A1* | 8/2013 | Gentry | H04L 9/008 380/277 |
| 2015/0312028 A1 | 10/2015 | Cheon et al. | |
| 2018/0375640 A1* | 12/2018 | Laine | H04L 9/008 |
| 2019/0334694 A1* | 10/2019 | Chen | H04L 9/008 |
| 2019/0334708 A1* | 10/2019 | Carpov | H04L 9/008 |
| 2019/0363871 A1 | 11/2019 | Cheon et al. | |

OTHER PUBLICATIONS (Leveled) fully homomorphic encryption without bootstrapping, by Gentry et al., published 2014 (Year: 2014).*

* cited by examiner

| FLD | CTLI |
|---|---|
| F1 | CL1 |
| F2 | CL2 |
| F3 | CL3 |

| CTLI | PPM |
|------|-----|
| CL1  | P1  |
| CL2  | P2  |
| CL3  | P3  |

| FLD | SCLI |
|-----|------|
| F1  | SC1  |
| F2  | SC2  |
| F3  | SC3  |

| CTLI | SCLI | PPM |
|---|---|---|
| CL1 | SC1 | P11 |
|  | SC2 | P12 |
|  | SC3 | P13 |
| CL2 | SC1 | P14 |
|  | SC2 | P15 |
|  | SC3 | P16 |
| CL3 | SC1 | P17 |
|  | SC2 | P18 |
|  | SC3 | P19 |

HOMOMORPHIC ENCRYPTION PROCESSING DEVICE, SYSTEM INCLUDING THE SAME AND METHOD OF PERFORMING HOMOMORPHIC ENCRYPTION PROCESSING

CROSS-REFERENCE TO RELATED APPLICATION

This U.S. non-provisional application claims priority under 35 USC § 119 to Korean Patent Application No. 10-2020-0053287, filed on May 4, 2020, in the Korean Intellectual Property Office (KIPO), the disclosure of which is incorporated by reference herein in its entirety.

BACKGROUND

1. Technical Field

Example embodiments relate generally to homomorphic encryption technologies, and more particularly to a homomorphic encryption processing device, a system including a homomorphic encryption processing device and a method of operating a homomorphic encryption processing device.

2. Discussion of the Related Art

A homomorphic encryption technology supports operations such as a computation, search and analysis in encrypted state. The homomorphic encryption technology is becoming more important in modern times as leakage of personal information becomes a problem. However, a size of a homomorphic ciphertext encrypted according to the homomorphic encryption technology may reach several tens of times a size of a plaintext, and a computational complexity of operations supported by the homomorphic encryption technology may also be very high.

SUMMARY

Some example embodiments may provide a homomorphic encryption processing device, a system including a homomorphic encryption processing device and a method of operating a homomorphic encryption processing device, capable of generating homomorphic encryption parameter according to a technology field to which homomorphic encryption processing is applied, and performing one of a homomorphic encryption, a homomorphic decryption and homomorphic operation based on the homomorphic encryption parameter.

According to example embodiments, a homomorphic encryption processing device comprises processing circuitry configured to generate ciphertext operation level information based on field information. The field information represents a technology field to which homomorphic encryption processing is applied. The ciphertext operation level information represents a maximum number of multiplication operations between homomorphic ciphertexts without a bootstrapping process. The processing circuitry is further configured to select and output a homomorphic encryption parameter based on the ciphertext operation level information. The processing circuitry is further configured to perform one of a homomorphic encryption, a homomorphic decryption and a homomorphic operation, based on the homomorphic encryption parameter.

According to example embodiments, a method of performing homomorphic encryption processing comprises receiving field information representing a technology field to which homomorphic encryption processing is applied, generating ciphertext operation level information representing a maximum number of multiplication operations between homomorphic ciphertexts without a bootstrapping process, selecting a homomorphic encryption parameter based on the ciphertext operation level information, and performing one of a homomorphic encryption, a homomorphic decryption and a homomorphic operation, based on the homomorphic encryption parameter.

According to example embodiments, a homomorphic encryption system comprises a homomorphic encryption processing server, and one or more homomorphic encryption clients configured to request a service to the homomorphic encryption server. At least one of the homomorphic encryption processing server and the homomorphic encryption clients includes a homomorphic encryption processing device. The homomorphic encryption processing device comprises processing circuitry configured to generate ciphertext operation level information based on field information, the field information representing a technology field to which homomorphic encryption processing is applied, the ciphertext operation level information representing a maximum number of multiplication operations between homomorphic ciphertexts without a bootstrapping process, configured to select and output a homomorphic encryption parameter based on the ciphertext operation level information, and configured to perform one of a homomorphic encryption, a homomorphic decryption and a homomorphic operation, based on the homomorphic encryption parameter.

The homomorphic encryption processing device, the system including the homomorphic encryption processing device and the method of performing a homomorphic encryption processing according to example embodiments of the present inventive concepts may adaptively generate a homomorphic encryption parameter according to a ciphertext operation level information determined based on a field information, and may perform a homomorphic encryption, a homomorphic decryption and a homomorphic operation based on the homomorphic encryption parameter. Accordingly, the homomorphic encryption processing device, the system including the homomorphic encryption processing device and the method of performing the homomorphic encryption processing may adaptively perform the homomorphic encryption, the homomorphic decryption and the homomorphic operation in consideration of the field information.

BRIEF DESCRIPTION OF THE DRAWINGS

Example embodiments of the present disclosure will be more clearly understood from the following detailed description taken in conjunction with the accompanying drawings.

DETAILED DESCRIPTION OF EXAMPLE EMBODIMENTS

Figure 1:
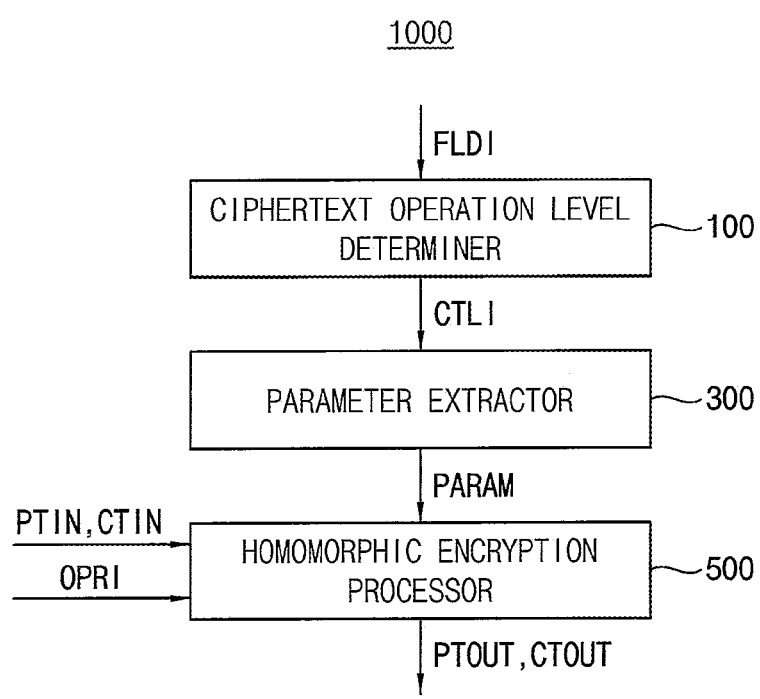
FIG. 1 is a block diagram illustrating a homomorphic encryption processing device according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a homomorphic encryption processing device according to some example embodiments.

Referring to FIG. 1, a homomorphic encryption processing device 1000 includes a ciphertext operation level determiner 100, a parameter extractor 300 and/or a homomorphic encryption processor 500.

The ciphertext operation level determiner 100 receives field information FLDI from outside (for example, external to the ciphertext operation level determiner 100 or the homomorphic encryption processing device 1000), generates ciphertext operation level information CTLI based on the field information FLDI and outputs the ciphertext operation level information CTLI to the parameter extractor 300.

The field information FLDI may represent one of a plurality of technology fields to which homomorphic encryption processing is applied. In some example embodiments, the technology field may be one of information and communication industry, finance and insurance industry, transportation and warehousing industry, service industry and healthcare industry. In some example embodiments, the plurality of technology fields may be classified according to a size of an amount of computational quantity of a homomorphic operation. The field information FLDI may also be referred to as scenario information in the sense of information representing an overall situation, such as process or result of homomorphic encryption technology being applied to the technology fields.

The ciphertext operation level information CTLI is generated based on the field information FLDI and may include information on a performance of a homomorphic operation performed by the homomorphic encryption processor 500. For example, the ciphertext operation level information CTLI may include a value of a ciphertext operation level representing a maximum number of multiplication operations between homomorphic ciphertexts be performed without a bootstrapping process. In some example embodiments, the ciphertext operation level may be determined to be one of 20, 30 and 40, but a scope of the present inventive concepts is not limited thereto.

When the value of the ciphertext operation level increases, for example 20->40, performance of the homomorphic operation may increase, and a size of the ciphertext generated by the homomorphic encryption and a computational complexity of the homomorphic operation may increase. Conversely, when the value of the ciphertext operation level decreases, for example 40->20, the performance of the homomorphic operation may decrease, and the size of the ciphertext generated by the homomorphic encryption and the computational complexity of the homomorphic operation may decrease.

The parameter extractor 300 receives the ciphertext operation level information CTLI from the ciphertext operation level determiner 100, selects a homomorphic encryption parameter PARAM according to homomorphic encryption schemes based on the ciphertext operation level information CTLI, and outputs the homomorphic encryption parameter PARAM to the homomorphic encryption processor 500. The homomorphic encryption schemes may be predetermined or alternatively, desired, and the homomorphic encryption parameter PARAM may be selected among a plurality of parameters corresponding to the homomorphic encryption schemes, but the scope of the present inventive concepts is not limited thereto.

The homomorphic encryption processor 500 receives the homomorphic encryption parameter PARAM from the parameter extractor 300, and receives at least one of a plaintext PTIN and a homomorphic ciphertext CTIN from outside (for example, external to the homomorphic encryption processor 500 or the homomorphic encryption processing device 1000). The homomorphic encryption processor 500 may perform a homomorphic encrypting on the plaintext PTIN based on the homomorphic encryption parameter PARAM to generate a homomorphic ciphertext CTOUT. The homomorphic encryption processor 500 may perform a homomorphic decrypting on a homomorphic ciphertext CTIN based on the homomorphic encryption parameter PARAM to generate a plaintext PTOUT. The homomorphic encryption processor 500 may perform a homomorphic operation on a homomorphic ciphertext CTIN based on the homomorphic encryption parameter PARAM to generate a homomorphic ciphertext CTOUT. The homomorphic encryption processor 500 may further receive operation mode information OPRI for determining an operation mode of the homomorphic encryption processor 500 from outside (for example, external to the homomorphic encryption processor 500 or the homomorphic encryption processing device 1000). The homomorphic encryption processor 500 may perform one of the homomorphic encryption, the homomorphic decryption and the homomorphic operation based on the operation mode information OPRI.

The homomorphic encryption processing device 1000 may be implemented on a homomorphic encryption system. When the homomorphic encryption system includes a homomorphic encryption processing server, a homomorphic encryption clients and a communication network, the homomorphic encryption processing device 1000 may be implemented in at least one of the homomorphic encryption processing server and the homomorphic encryption clients, but the scope of the present inventive concepts is not limited thereto.

As described above, the homomorphic encryption technology has advantages in terms of personal information security, but has disadvantages in terms of a size or computational complexity of a homomorphic ciphertext. However, the homomorphic encryption processing device 1000 adaptively generates a homomorphic encryption parameter PARAM according to ciphertext operation level information CTLI determined based on the field formation FLDI, and performs a homomorphic encryption, a homomorphic decryption and a homomorphic operation based on the homomorphic encryption parameter PARAM. Accordingly, the homomorphic encryption device 1000 may adaptively perform the homomorphic encryption, the homomorphic decryption and the homomorphic operation based on the field information FLDI. A detailed description will be described later.

Figures 2A, 2B:
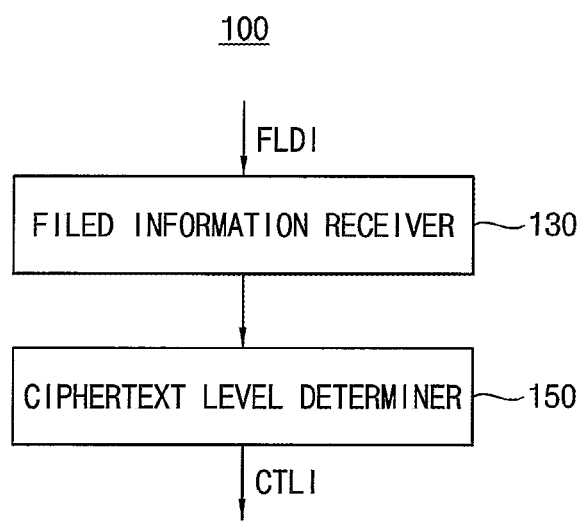
FIG. 2A is a block diagram illustrating example embodiments of a ciphertext operation level determiner of FIG. 1
FIG. 2B is a diagram for describing a relationship between technology fields and ciphertext operation levels.

FIG. 2A is a block diagram illustrating example embodiments of a ciphertext operation level determiner of FIG. 1, and FIG. 2B is a diagram for describing a relationship between technology fields and ciphertext operation levels.

Referring to FIGS. 1 and 2A, the ciphertext operation level determiner 100 includes a field information receiver 130 and/or a ciphertext level determiner 150.

The field information receiver 130 may receive the field information FLDI from outside (for example, external to the field information receiver 130 or the homomorphic encryption processing device 1000), and may output the field information FLDI to the ciphertext level determiner 150. As described above, the homomorphic encryption processing device 1000 may be implemented in at least one of the homomorphic encryption processing server and the homomorphic encryption clients. In some example embodiments, when the homomorphic encryption processing device 1000 is implemented in the homomorphic encryption processing server, the field information FLDI may be generated by the homomorphic encryption processing server itself. In other example embodiments, when the homomorphic encryption processing device 1000 is implemented in the homomorphic encryption clients, the field information FLDI may be generated by the homomorphic encryption clients and transmitted to the homomorphic encryption processing server. In some example embodiments, the field information FLDI may be generated by an application executed to use the homomorphic encryption technology in the homomorphic encryption processing server or the homomorphic encryption clients, but the scope of the present inventive concepts is not limited thereto.

The ciphertext level determiner 150 may receive the field information FLDI from the field information receiver 130, and generate the ciphertext level information CTLI based on the field information FLDI. Hereinafter, the relationship between the technology fields FLD and the ciphertext operation levels CTLI will be described.

Referring to FIG. 2B, the field information FLDI may correspond to one of a plurality of technology fields, and the plurality of technology fields may be classified into first to third fields F1, F2 and F3 according to a size of an amount of computational quantity of the homomorphic operation. In some example embodiments, only the homomorphic operation with the smallest computational quantity may be performed to the technology field classified as the first field F1, and then the homomorphic operation with increased computational quantity in the order of the second field F2 and the third field F3 may be performed. For example, only homomorphic operation of arithmetic operations may be performed for the technology field classified as the first field F1, the homomorphic operation of exponential and logarithmic operations may be further performed for the technology field classified as the second field F2, and the homomorphic operation of derivative operations may be further performed for the technology field classified as the third field F3. In example embodiments, the first field may represent a technology field related to a data search or a data evaluation, the second field may represent a technology field related to a data analysis, and the third field may represent a technology field related to a machine learning. But the scope of the present inventive concepts is not limited thereto.

The ciphertext operation level information CTLI is determined based on the field information FLDI, and may include a plurality of ciphertext operation levels according to the performance of the homomorphic operation performed by the homomorphic encryption processor 500. In some example embodiments, the ciphertext operation level information CTLI may include first to third ciphertext operation levels CL1, CL2 and CL3. In some example embodiments, each of the first to third ciphertext operation levels CL1, CL2 and CL3 may include a value representing a maximum number of multiplication operations between homomorphic ciphertexts without a bootstrapping process. For example, the first ciphertext operation level CL1 may include a value of 20, the second ciphertext operation level CL2 may include a value of 30 and the third ciphertext operation level CL3 may include a value of 40, but the scope of the present inventive concepts is not limited thereto.

As illustrated in FIG. 2B, when the number of the plurality of technology fields is equal to the number of the ciphertext operation levels, each of the plurality of technology fields and each of the ciphertext operation levels are matched one-to-one. For example, the first field F1 may be matched to the first ciphertext operation level CL1, the second field F2 may be matched to the second ciphertext operation level CL2, and the third field F3 may be matched to the third ciphertext operation level CL3. But the scope of the present inventive concepts is not limited thereto. When the number of the plurality of technology fields is not equal to the number of the ciphertext operation levels, each of the plurality of technology fields and each of the ciphertext operation levels may be matched one-to-many or many-to-one.

Figures 3A, 3B:
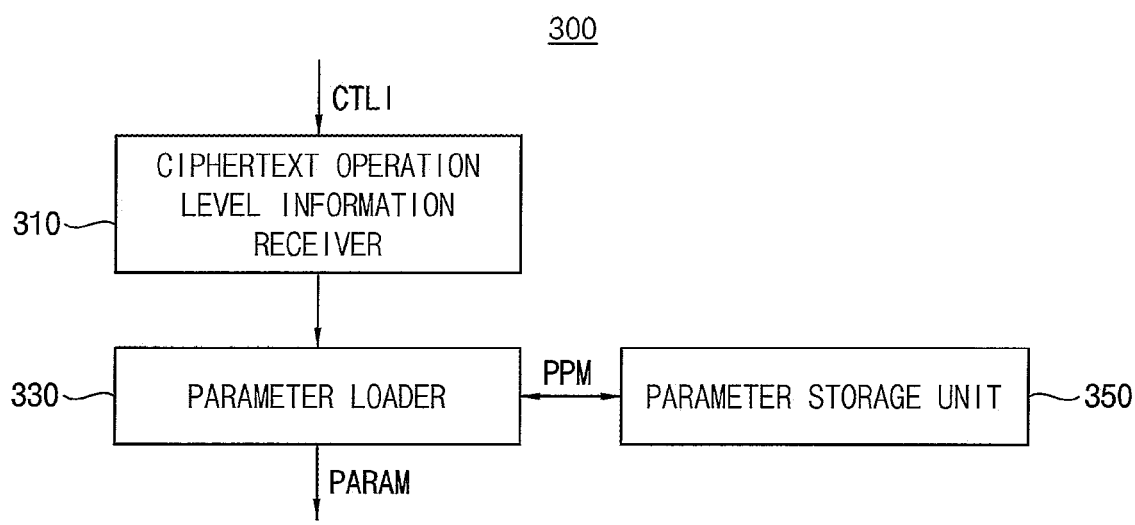
FIG. 3A is a block diagram illustrating example embodiments of a parameter extractor of FIG. 1
FIG. 3B is a diagram for describing a relationship between ciphertext operation levels and a plurality of parameters.

FIG. 3A is a block diagram illustrating example embodiments of a parameter extractor of FIG. 1, and FIG. 3B is a diagram for describing a relationship between ciphertext operation levels and a plurality of parameters.

Referring to FIGS. 1 and 3a, the parameter extractor 300 includes a ciphertext operation level receiver 310, a parameter loader 330 and/or a parameter storage unit 350.

The ciphertext operation level receiver 310 may receive the ciphertext operation level information CTLI from the ciphertext operation level determiner 100, and may output a ciphertext operation level based on the ciphertext operation level information CTLI to the parameter loader 330.

The parameter loader 330 may receive the ciphertext operation level information CTLI from the ciphertext operation level receiver 310, and receive a plurality of parameters PPM from the parameter storage unit 350.

The parameter loader 330 may select a portion of the plurality of parameters PPM based on the ciphertext operation level information CTLI and output the selected parameters as the homomorphic encryption parameter PARAM to the homomorphic encryption processor 500.

The plurality of parameters PPM may be parameters required to perform the homomorphic encryption, the homomorphic decryption and the homomorphic operation according to a predetermined or alternatively, desired homomorphic encryption scheme. The homomorphic encryption scheme may be classified from various viewpoints. In some example embodiments, the homomorphic encryption scheme may be one of partial homomorphic encryption supporting only some operations between homomorphic ciphertexts, somewhat homomorphic encryption supporting a limited number of operations between the homomorphic ciphertexts, and fully homomorphic encryption supporting an unlimited number of operations between the homomorphic ciphertexts. In other example embodiments, the homomorphic encryption scheme may be one of digitwise homomorphic encryption and bitwise homomorphic encryption. Hereinafter, the relationship between the ciphertext operation level information CTLI and the plurality of parameters PPM will be described. For convenience of explanation, the plurality of parameters PPM are based on a grid-based cipher capable of responding to quantum computer attacks, and is assumed to be one of parameters to be required according to the homomorphic encryption scheme based on Ring-Learning With Errors (Ring-LWE). But the scope of the present inventive concepts is not limited thereto.

Referring to FIG. 3B, the ciphertext operation level information CTLI is determined based on the field information FLDI, and the ciphertext operation level information CTLI may include first to third ciphertext operation levels CL1, CL2 and CL3 according to a performance of the homomorphic operation performed by the homomorphic encryption processor 500.

The homomorphic encryption parameter PARAM is selected based on the ciphertext operation level information CTLI, and may be selected from one of the first to third parameters P1, P2 and P3. In some example embodiments, each of the first to third parameters P1, P2 and P3 may include parameters related to encoding, decoding, multi-message packing, encryption, decryption and key generation, but the scope of the present inventive concepts is not limited thereto. In other example embodiments, each of the first to third parameters P1, P2 and P3 may further include parameters related to digit adjustment or key switching. In other example embodiments, each of the first to third parameters P1, P2 and P3 may include a parameter having a value of the ciphertext operation level as an exponential factor. For example, when the first ciphertext operation level CL1 is 20, the second ciphertext operation level CL2 is 30, and the third ciphertext operation level CL3 is 40, the first parameter P1 may include $p^{20}q$, the second parameter P2 may include $p^{30}q$, and the third parameter P3 may include $p^{40}q$ (in example embodiments, the p and the q are different prime numbers.). But the scope of the present inventive concepts is not limited thereto.

As illustrated in FIG. 3B, when the number of ciphertext operation levels included in the ciphertext operation level information CTLI is equal to the number of the plurality of parameters, each of the ciphertext operation levels and each of the plurality of parameters are matched one-to-one. For example, the first ciphertext operation level CL1 may be matched to the first parameter P1, the second ciphertext operation level CL2 may be matched to the second parameter P2, and the third ciphertext operation level CL3 may be matched to the third parameter P3. but the scope of the present inventive concepts is not limited thereto. When the number of the ciphertext operation levels is not equal to the number of the plurality of parameters, each of the ciphertext operation levels and each of the plurality of parameters may be matched one-to-many or many-to-one.

Figure 4:
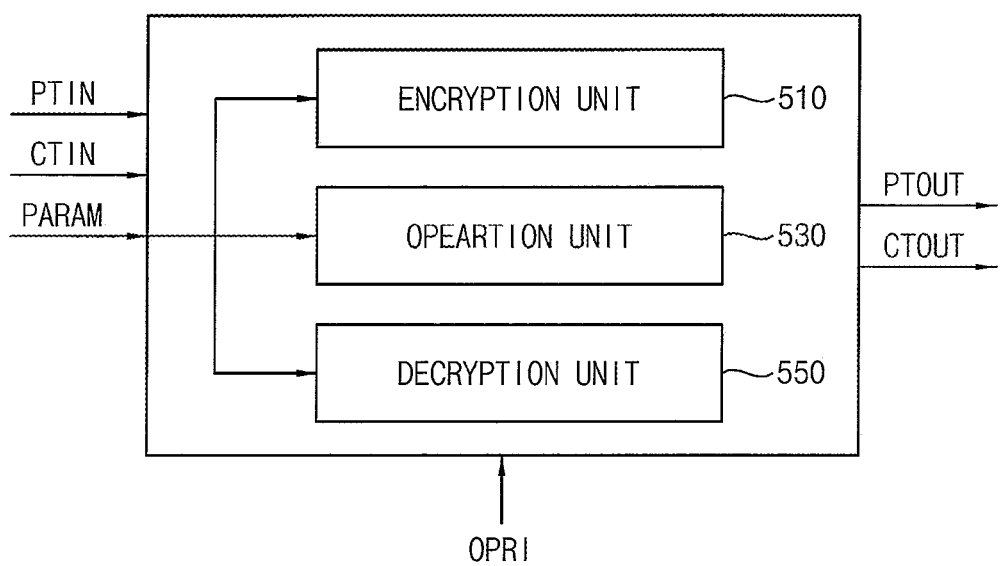
FIG. 4 is a block diagram illustrating example embodiments of a homomorphic encryption processor of FIG. 1.
Figure 5A:
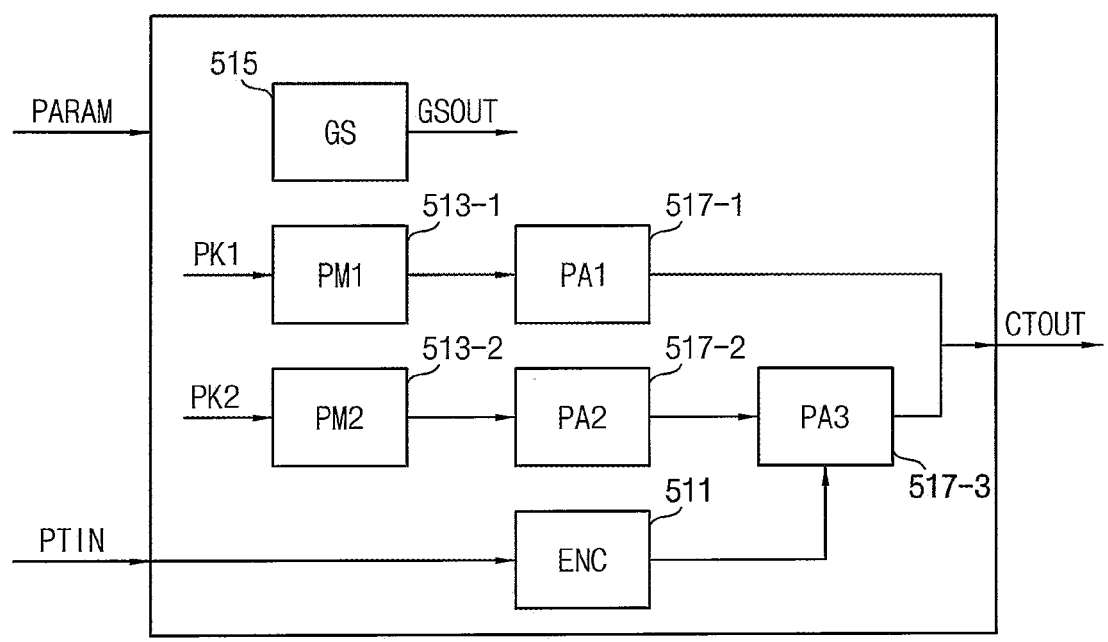
FIG. 5A is a block diagram illustrating example embodiments of an encryption unit of FIG. 4.
Figure 5B:
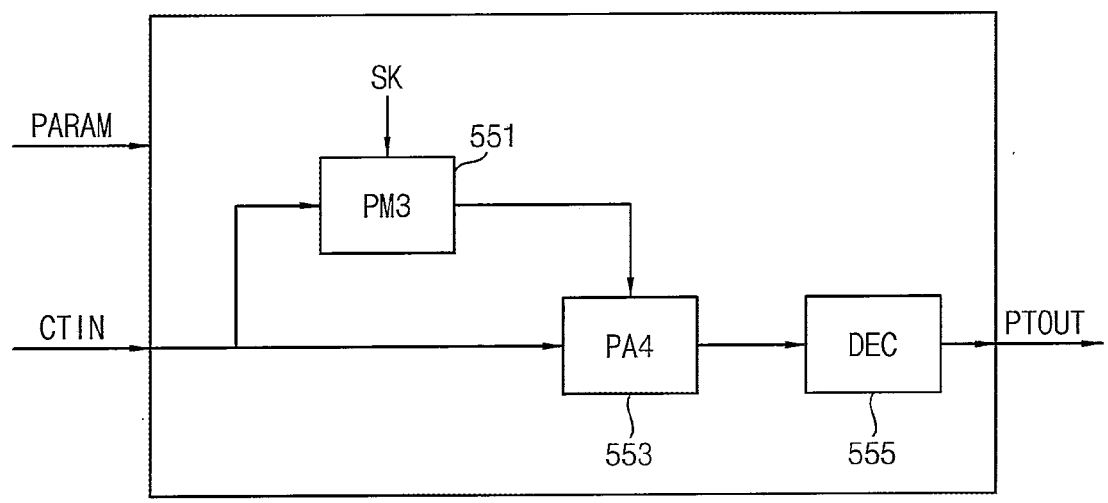
FIG. 5B is a block diagram illustrating example embodiments of a decryption unit of FIG. 4.

FIG. 4 is a block diagram illustrating example embodiments of a homomorphic encryption processor of FIG. 1. FIG. 5A is a block diagram illustrating example embodiments of an encryption unit of FIG. 4, and FIG. 5B is a block diagram illustrating example embodiments of a decryption unit of FIG. 4.

Referring to FIG. 4, the homomorphic encryption processor 500 includes an encryption unit 510, an operation unit 530 and/or a decryption unit 550.

The homomorphic encryption processor 500 receives a homomorphic encryption parameter PARAM from the parameter extractor 300, and receives at least one of a plaintext PTIN or a homomorphic ciphertext CTIN from outside (for example, external to the homomorphic encryption processor 500 or the homomorphic encryption processing device 1000).

The encryption unit 510 may generate a homomorphic ciphertext CTOUT by performing a homomorphic encrypting on the plaintext PTIN based on the homomorphic encryption parameter PARAM. The decryption unit 550 may generate a plaintext PTOUT by performing a homomorphic decrypting on the homomorphic ciphertext CTIN based on the homomorphic encryption parameter PARAM. The operation unit 530 may generate a homomorphic ciphertext CTOUT by performing a homomorphic operation on a homomorphic ciphertext CTIN based on the homomorphic encryption parameter PARAM.

The homomorphic encryption processor 500 may further receive operation mode information OPRI for determining an operation mode of the homomorphic encryption processor 500 from outside (for example, external to the homomorphic encryption processor 500 or the homomorphic encryption processing device 1000). The operation mode information OPRI may include information for activating one of the encryption unit 510, the operation unit 530 and/or the decryption unit 550. The homomorphic encryption processor 500 may perform one of the homomorphic encryption, the homomorphic decryption and the homomorphic operation based on the operation mode information OPRI.

Referring to FIG. 5A, the encryption unit 510 includes an encoder 511, polynomial multipliers 513-1 and 513-2, a Gaussian sampler 515 and/or polynomial adders 571-1, 517-2 and 517-3.

The encryption unit 510 may receive a plaintext PTIN and a homomorphic encryption parameter PARAM, and generate a homomorphic ciphertext CTOUT by performing a homomorphic encrypting based on the homomorphic encryption parameter PARAM. The homomorphic encryption parameter PARAM may include public keys PK1 and PK2, a standard deviation of the Gaussian sampler 515 and parameters related to prime numbers for encoding. An output value GSOUT of the Gaussian sampler 515 may be input to the polynomial multipliers 531-1 and 513-2 and the polynomial adders 517-1 and 517-2, respectively. But the scope of the present inventive concepts is not limited thereto.

Referring to FIG. 5B, the decryption unit 550 includes a polynomial multiplier 531, a polynomial adder 553 and/or a decoder 555.

The decryption unit 550 may receive a homomorphic ciphertext CTIN and a homomorphic encryption parameter PARAM, and generate a plaintext PTOUT by performing a homomorphic decrypting based on the homomorphic encryption parameter PARAM. The homomorphic encryption parameter PARAM may include parameters related to secret keys SK, but the scope of the present inventive concepts is not limited thereto.

Figure 6:
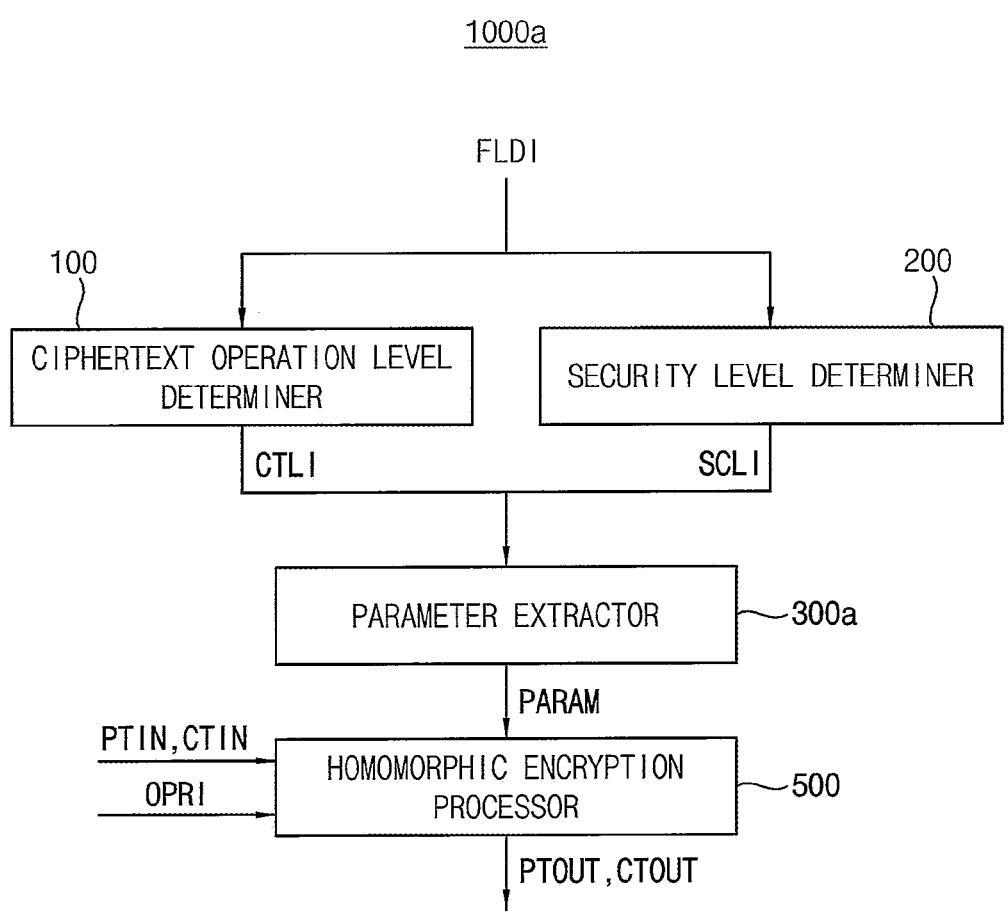
FIG. 6 is a block diagram illustrating a homomorphic encryption processing device according to some example embodiments.

FIG. 6 is a block diagram illustrating a homomorphic encryption processing device according to some example embodiments.

In the homomorphic encryption processing devices 1000 and 1000a illustrated in FIGS. 1 and 6, components using the same reference numerals perform similar functions, and thus, a duplicate description will be omitted below.

Referring to FIG. 6, a homomorphic encryption processing device 1000a includes a ciphertext operation level determiner 100, a security level determiner 200, a parameter extractor 300a and/or a homomorphic encryption processor 500.

The ciphertext operation level determiner 100 receives field information FLDI from outside (for example, external to the ciphertext operation level determiner 100 or the homomorphic encryption processing device 1000), generates ciphertext operation level information CTLI based on the field information FLDI and outputs to the parameter extractor 300.

The security level determiner 200 receives field information FLDI from outside (for example, external to the security level determiner 200 or the homomorphic encryption processing device 1000), generates security level information SCLI based on the field information FLDI and outputs the security level information SCLI to the parameter extractor 300. The security level information SCLI is determined based on the field information FLDI, may include values that reduces or prevents a win rate from exceeding $1/(2^R)$, the R is a value of security level included in the security level information SCLI, in a problem related to the homomorphic encryption. In some example embodiments, the value of security level may be determined to be one of 128, 192 and 256, but the scope of the present inventive concepts is not limited thereto.

The parameter extractor 300a receives the ciphertext operation level information CTLI from the ciphertext operation level determiner 100 and receives the security level information SCLI from the security level determiner 200. The parameter extractor 300a determines a homomorphic encryption parameter PARAM based on the ciphertext operation level information CTLI and the security level information SCLI, and outputs the homomorphic encryption parameter PARAM to the homomorphic encryption processor 500.

The homomorphic encryption processor 500 receives the homomorphic encryption parameter PARAM from the parameter extractor 300, and receives at least one of a plaintext PTIN and a homomorphic ciphertext CTIN from outside (for example, external to the homomorphic encryption processor 500 or the homomorphic encryption processing device 1000). The homomorphic encryption processor 500 may perform a homomorphic encrypting on the plaintext PTIN based on the homomorphic encryption parameter PARAM to generate a homomorphic ciphertext CTOUT. The homomorphic encryption processor 500 may perform a homomorphic decrypting on a homomorphic ciphertext CTIN based on the homomorphic encryption parameter PARAM to generate a plaintext PTOUT. The homomorphic encryption processor 500 may perform a homomorphic operation on a homomorphic ciphertext CTIN based on the homomorphic encryption parameter PARAM to generate a homomorphic ciphertext CTOUT. The homomorphic encryption processor 500 may further receive operation mode information OPRI for determining an operation mode of the homomorphic encryption processor 500 from outside (for example, external to the homomorphic encryption processor 500 or the homomorphic encryption processing device 1000). The homomorphic encryption processor 500 may perform one of the homomorphic encryption, the homomorphic decryption and the homomorphic operation based on the operation mode information OPRI.

Figures 7A, 7B:
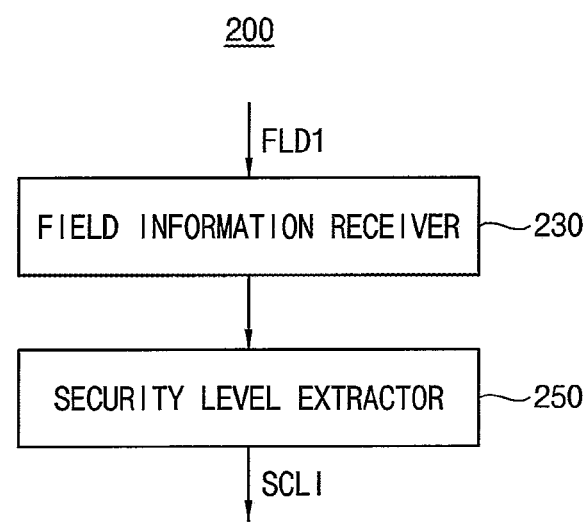
FIG. 7A is a block diagram illustrating example embodiments of a security level determiner of FIG. 6.
FIG. 7B is a diagram for describing a relationship between technology fields and security levels.

FIG. 7A is a block diagram illustrating example embodiments of a security level determiner of FIG. 6, and FIG. 7B is a diagram for describing a relationship between technology fields and security levels.

Referring to FIGS. 6 and 7a, a security level determiner 200 includes a field information receiver 230 and/or a security level extractor 250.

The field information receiver 230 may receive the field information FLDI from outside (for example, external to the field information receiver 230 or the homomorphic encryption processing device 1000), and may output the field information FLDI to the security level extractor 250. The security level extractor 250 may receive the field information FLDI from the field information receiver 230, and may determine the security level information SCLI based on the field information FLDI. Hereinafter, the relationship between the field information FLDI and the security level information SCLI will be described.

Referring to FIG. 7b, the field information FLDI may correspond to one of a plurality of technology fields, and the plurality of technology fields may be classified into first to third fields F1, F2 and F3 according to a size of an amount of computational quantity of the homomorphic operation.

The security level information SCLI is determined based on the field information FLDI, and may include a first security level to a third security level SC1, SC2 and SC3 according to the security level of the homomorphic encryption system. In some example embodiments, each of the first to third security levels SC1, SC2 and SC3 may include a value representing the minimum number of bit operations required to efficiently attack the homomorphic encryption system. For example, the first security level SC1 may include a value of 128, the second security level SC2 may include a value of 192, and the third security level SC3 may include a value of 256, but the scope of the present inventive concepts is not limited thereto.

As illustrate in FIG. 7B, when the number of the plurality of technology fields is equal to the number of the security levels, each of the plurality of technology fields and each of the security levels are matched one-to-one. For example, the first field F1 may be matched to the first security level SC1, the second field F2 may be matched to the second security level SC2 and the third field F3 may be matched to the third security level SC3. But the scope of the present inventive concepts is not limited thereto. When the number of the plurality of technology fields is not equal to the number of the security levels, each of the plurality of technology fields and each of the security levels may be matched one-to-many or many-to-one.

Figures 8A, 8B:
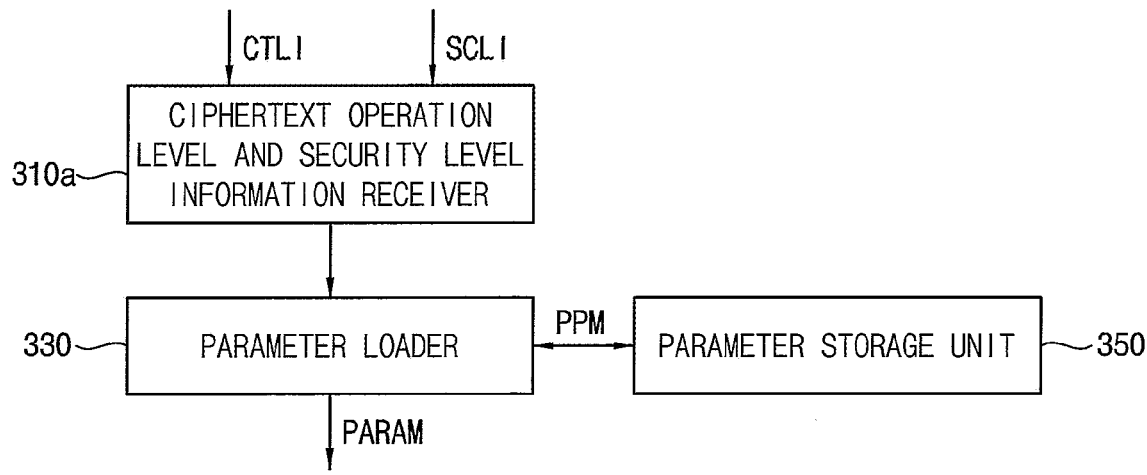
FIG. 8A is a block diagram illustrating a parameter extractor of FIG. 6.
FIG. 8B is a diagram for describing ciphertext operation levels, security levels and a plurality of parameters.

FIG. 8A is a block diagram illustrating a parameter extractor of FIG. 6, and FIG. 8B is a diagram for describing ciphertext operation levels, security levels and a plurality of parameters.

In the parameter extractors 300 and 300a illustrated in FIGS. 3A and 8A, components using the same reference numerals perform similar functions, and thus, redundant descriptions will be omitted below.

Referring to FIGS. 6 and 8A, the parameter extractor 300a includes a ciphertext level and security level information receiver 310a, a parameter loader 330 and/or a parameter storage unit 350.

The ciphertext operation level and security level information receiver 310a may receive the ciphertext operation level information CTLI from the ciphertext operation level determiner 100 and may receive the security level information SCLI from the security level determiner 200 and may output the ciphertext operation level information CTLI and the security level information SCLI to the parameter loader 330.

The parameter loader 330 may receive the ciphertext operation level information CTLI and the security level information SCLI from the ciphertext operation level and security level information receiver 310a, may receive a plurality of parameters PPM from the parameter storage unit 350. The plurality of parameters PPM may be parameters required to perform the homomorphic encryption, the homomorphic decryption and the homomorphic operation according to a predetermined or alternatively, desired homomorphic encryption scheme. Hereinafter, the relationship between the ciphertext operation level information CTLI, the security level information SCLI and the plurality of parameters PPM will be described. For convenience of explanation, the plurality of parameters PPM are based on a grid-based cipher capable of responding to quantum computer attacks, and is assumed to be one of parameters to be required according to the homomorphic encryption scheme based on Ring-Learning With Errors (Ring-LWE). But the scope of the present inventive concepts is not limited thereto.

Referring to FIG. 8B, the ciphertext operation level information CTLI may include first to third ciphertext operation levels CL1, CL2 and CL3, and the security level information SCLI may include first to third security levels SC1, SC2 and SC3. The plurality of parameters may include first to ninth parameters P11, P12, P13, P14, P15, P16, P17, P18 and P19. In some example embodiments, the first to ninth parameters P11, P12, P13, P14, P15, P16, P17, P18 and P19 may include a parameter having a value of the ciphertext operation level as an exponential factor. For example, when the first ciphertext operation level CL1 is 20, the second ciphertext operation level CL2 is 30, and the third ciphertext operation level CL3 is 40, the first to third parameters P11, P12 and P13 may include $p^{20}q$, the fourth to the sixth parameters P14, P15 and P16 may include $p^{30}q$, and the seventh to the ninth parameters P17, P18 and P19 may include $p^{40}q$ (in example embodiments, the p and the q are different prime numbers.). But the scope of the present inventive concepts is not limited thereto. In some example embodiments, the first to ninth parameters P11, P12, P13, P14, P15, P16, P17, P18 and P19 may include a different prime numbers, p and q, corresponding to the security level information SCLI. For example, the prime numbers, p and q, corresponding to the first security level SC1 may be 2 and 3, and the prime numbers, p and q, corresponding to the second security level SC2 may be 2 and 7, and the prime numbers, p and q, corresponding to the third security level SC3 may be 5 and 7. In some example embodiments, the first, the fourth and the seventh parameters P11, P14 and P17 may include 2 and 3 as the prime numbers, p and q, the second, the fifth and the eighth parameters P12, P15 and P18 may include 2 and 7 as the prime numbers, p and q, the third, the sixth and the ninth parameters P13, P16 and P19 may include 5 and 7 as the prime numbers, p and q, but the scope of the present inventive concepts is not limited thereto.

Figure 9:
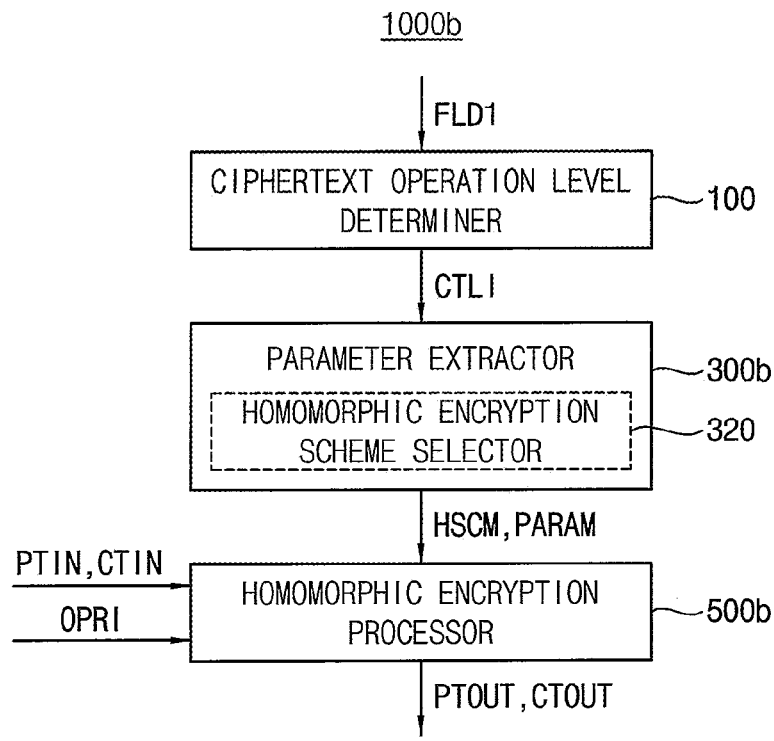
FIG. 9 is a block diagram illustrating example embodiments of a homomorphic encryption processing device according to some example embodiments.

FIG. 9 is a block diagram illustrating example embodiments of a homomorphic encryption processing device according to some example embodiments.

In the homomorphic encryption processing devices 1000, 1000a and 1000b illustrated in FIGS. 1, 6 and 9, components using the same reference numerals perform similar functions, and thus, a duplicate description will be omitted below.

Referring to FIG. 9, a homomorphic encryption processing device 1000b includes a ciphertext operation level determiner 100, a parameter extractor 300b and/or a homomorphic encryption processor 500b. The parameter extractor 300b further includes a homomorphic encryption scheme selector 320.

The ciphertext operation level determiner 100 receives field information FLDI from outside (for example, external to the ciphertext operation level determiner 100 or the homomorphic encryption processing device 1000), generates ciphertext operation level information CTLI based on the field information FLDI and outputs to the parameter extractor 300b.

The parameter extractor 300b receives the ciphertext operation level information CTLI from the ciphertext operation level determiner 100. The parameter extractor 300a determines a homomorphic encryption parameter PARAM based on the ciphertext operation level information CTLI, and outputs the homomorphic encryption parameter PARAM to the homomorphic encryption processor 500b.

The homomorphic encryption scheme selector 320 selects one of a plurality of homomorphic encryption schemes and outputs the selected homomorphic encryption scheme HSCM to the homomorphic encryption processor 500b. The homomorphic encryption schemes may include a partial homomorphic encryption scheme, a somewhat homomorphic encryption scheme and a fully homomorphic encryption scheme, but the scope of the present inventive concepts is not limited thereto.

The homomorphic encryption processor 500b receives the homomorphic encryption parameter PARAM and the selected homomorphic encryption scheme HSCM from the parameter extractor 300b, and receives at least one of a plaintext PTIN and a homomorphic ciphertext CTIN from outside (for example, external to the homomorphic encryption processor 500b or the homomorphic encryption processing device 1000). The homomorphic encryption processor 500 may perform a homomorphic encrypting on the plaintext PTIN based on the homomorphic encryption parameter PARAM and the selected homomorphic encryption scheme HSCM to generate a homomorphic ciphertext CTOUT. The homomorphic encryption processor 500b may perform a homomorphic decrypting on a homomorphic ciphertext CTIN based on the homomorphic encryption parameter PARAM and the selected homomorphic encryption scheme HSCM to generate a plaintext PTOUT. The homomorphic encryption processor 500b may perform a homomorphic operation on a homomorphic ciphertext CTIN based on the homomorphic encryption parameter PARAM and the selected homomorphic encryption scheme HSCM to generate a homomorphic ciphertext CTOUT. The homomorphic encryption processor 500b may further receive operation mode information OPRI for determining an operation mode of the homomorphic encryption processor 500 from outside (for example, external to the homomorphic encryption processor 500b or the homomorphic encryption processing device 1000). The homomorphic encryption processor 500b may perform one of the homomorphic encryption, the homomorphic decryption and the homomorphic operation based on the operation mode information OPRI.

Figure 10:
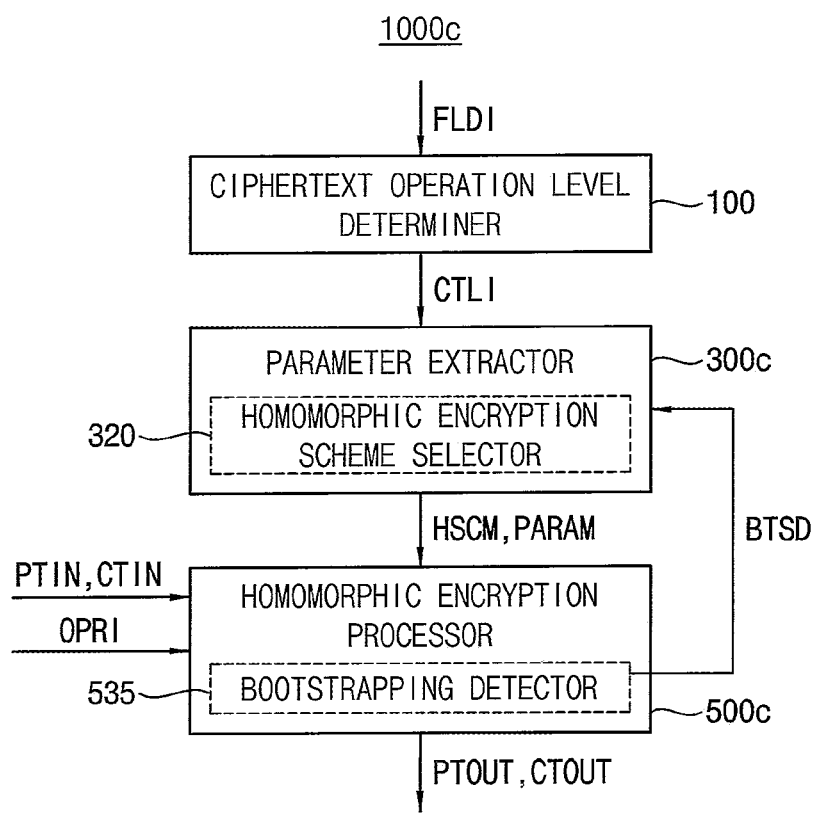
FIG. 10 is a block diagram illustrating example embodiments of a homomorphic encryption processing device according to some example embodiments.

FIG. 10 is a block diagram illustrating example embodiments of a homomorphic encryption processing device according to some example embodiments.

In the homomorphic encryption processing devices 1000, 1000a, 1000b and 1000c illustrated in FIGS. 1, 6, 9 and 10, components using the same reference numerals perform similar functions, and thus, a duplicate description will be omitted below.

Referring to FIG. 10, a homomorphic encryption processing device 1000c includes a ciphertext operation level determiner 100, a parameter extractor 300c and/or a homomorphic encryption processor 500c. The parameter extractor 300c further includes a homomorphic encryption scheme selector 320. The homomorphic encryption processor 500c further includes a bootstrapping detector 535.

The ciphertext operation level determiner 100 receives field information FLDI from outside (for example, external to the ciphertext operation level determiner 100 or the homomorphic encryption processing device 1000), generates ciphertext operation level information CTLI based on the field information FLDI and outputs to the parameter extractor 300c.

The parameter extractor 300c receives the ciphertext operation level information CTLI from the ciphertext operation level determiner 100. The parameter extractor 300c determines a homomorphic encryption parameter PARAM based on the ciphertext operation level information CTLI, and outputs the homomorphic encryption parameter PARAM to the homomorphic encryption processor 500c.

The homomorphic encryption scheme selector 320 selects one of a plurality of homomorphic encryption schemes and outputs the selected homomorphic encryption scheme HSCM to the homomorphic encryption processor 500c. The homomorphic encryption schemes may include a partial homomorphic encryption scheme, a somewhat homomorphic encryption scheme and a fully homomorphic encryption scheme, but the scope of the present inventive concepts is not limited thereto.

The homomorphic encryption processor 500c receives the homomorphic encryption parameter PARAM and the selected homomorphic encryption scheme HSCM from the parameter extractor 300c, and receives at least one of a plaintext PTIN and a homomorphic ciphertext CTIN from outside (for example, external to the homomorphic encryption processor 500c or the homomorphic encryption processing device 1000). The homomorphic encryption processor 500c may perform a homomorphic encrypting on the plaintext PTIN based on the homomorphic encryption parameter PARAM and the selected homomorphic encryption scheme HSCM to generate a homomorphic ciphertext CTOUT. The homomorphic encryption processor 500c may perform a homomorphic decrypting on a homomorphic ciphertext CTIN based on the homomorphic encryption parameter PARAM and the selected homomorphic encryption scheme HSCM to generate a plaintext PTOUT. The homomorphic encryption processor 500c may perform a homomorphic operation on a homomorphic ciphertext CTIN based on the homomorphic encryption parameter PARAM and the selected homomorphic encryption scheme HSCM to generate a homomorphic ciphertext CTOUT. The homomorphic encryption processor 500c may further receive operation mode information OPRI for determining an operation mode of the homomorphic encryption processor 500 from outside (for example, external to the homomorphic encryption processor 500c or the homomorphic encryption processing device 1000). The homomorphic encryption processor 500b may perform one of the homomorphic encryption, the homomorphic decryption and the homomorphic operation based on the operation mode information OPRI.

When performing the homomorphic operation on the homomorphic ciphertext CTIN, the bootstrapping detector 535 may generate bootstrapping detection information BTSD by detecting an occurrence of bootstrapping. Bootstrapping refers to a process of generating a new homomorphic ciphertext by reducing noise present in a homomorphic ciphertext obtained as a result of a multiplication operation when a number of the multiplication operation between homomorphic ciphertexts is performed exceeds a homomorphic capacity. In some example embodiments, the parameter extractor 300c receives the bootstrapping detection information BTSD from the bootstrapping detection unit 535, selects one of the plurality of parameters PPM and outputs the selected parameter PARAM to the homomorphic encryption processor 500c.

Figure 11:
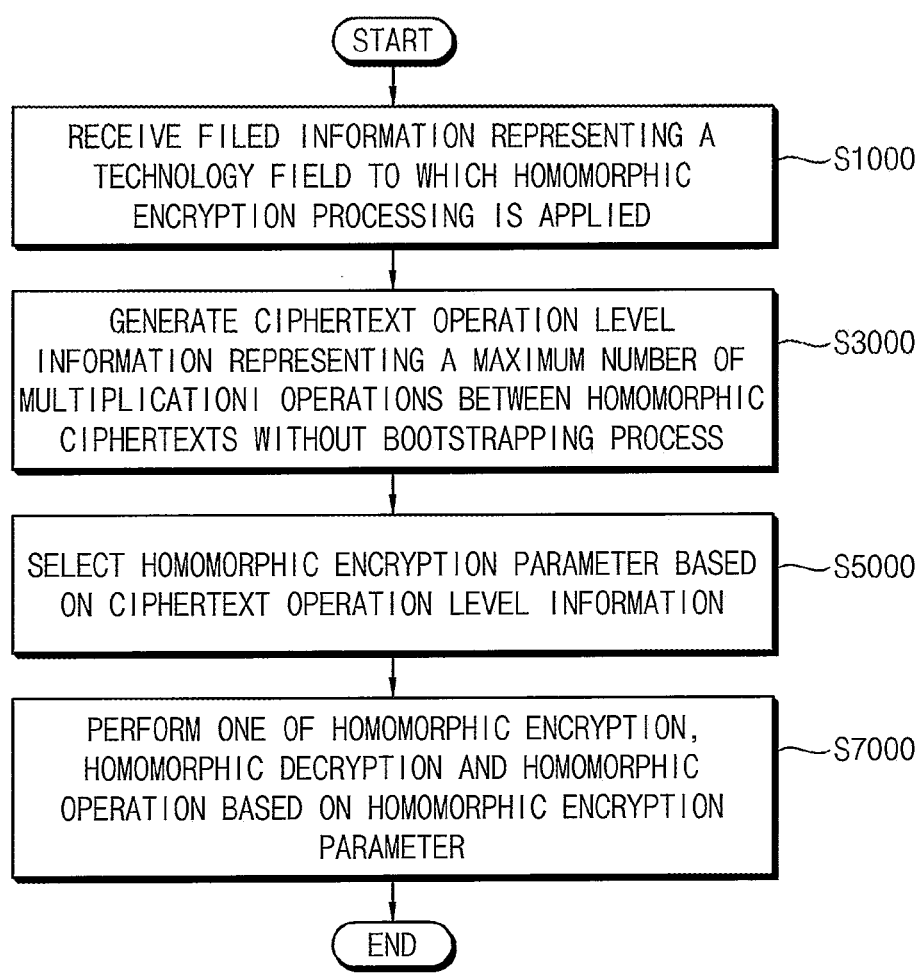
FIG. 11 is a flowchart illustrating a method of a homomorphic encryption processing according to some example embodiments.

FIG. 11 is a flowchart illustrating a method of a homomorphic encryption processing according to some example embodiments.

Referring to FIG. 11, field information representing one of a plurality of technology fields to which homomorphic encryption processing is applied is received (S1000). In some example embodiments, the technology field may be one of information and communication industry, finance and insurance industry, transportation and warehousing industry, service industry and healthcare industry. In some example embodiments, the plurality of technology fields may be classified according to a size of an amount of computational quantity of a homomorphic operation. The field information may also be referred to as scenario information in the sense of information representing an overall situation, such as process or result of homomorphic encryption technology being applied to the technology fields.

Based on the field information, ciphertext operation level information is generated (S3000). In some example embodiments, the ciphertext operation level information may include a value of a ciphertext operation levels representing a maximum number of multiplication operations between homomorphic ciphertexts may be performed without a bootstrapping process. In some example embodiments, the ciphertext operation level may be determined to be one of 20, 30 and 40, but a scope of the present inventive concepts is not limited thereto. When the value of the ciphertext operation level increases, for example 20->40, performance of the homomorphic operation may increase, and a size of the ciphertext generated by the homomorphic encryption and a computational complexity of the homomorphic operation may increase. Conversely, when the value of the ciphertext operation level decreases, for example 40->20, the performance of the homomorphic operation may decrease, and the size of the ciphertext generated by the homomorphic encryption and the computational complexity of the homomorphic operation may decrease.

A homomorphic encryption parameter is selected based on the ciphertext operation level information (S5000). In some example embodiments, the homomorphic encryption parameter may be selected among a plurality of parameters corresponding to the homomorphic encryption schemes, but the scope of the present inventive concepts is not limited thereto.

A homomorphic encryption, a homomorphic decryption and a homomorphic operation is performed based on the homomorphic encryption parameter (S7000).

Figure 12:
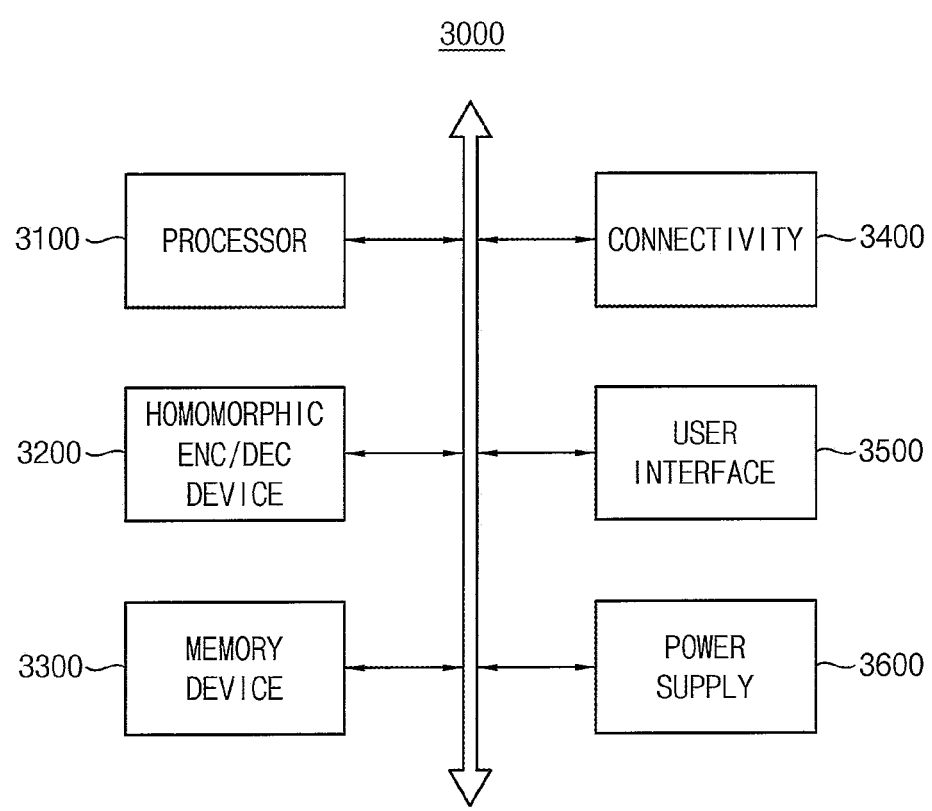
FIG. 12 is a server and clients including a homomorphic encryption processing device according to some example embodiments.

FIG. 12 is a server and clients including a homomorphic encryption processing device according to some example embodiments.

Referring to FIG. 12, a client or a server 3000 includes a processor 3100, a homomorphic encryption and decryption device 3200, a memory device 3300, a connectivity unit 3400, a user interface 3500 and/or a power supply 3600.

The client or the server 3000 may be any mobile system or computing system.

The processor 3100 controls an overall operation of the client or the server 3000, executes an operating system, an application, etc., and executes various computing functions such as specific calculations or tasks. The connectivity unit 3400 communicates with an external device. The memory device 3300 stores data processed by the processor 3100 or operates as a working memory. The user interface 3500 includes one or more input devices such as keypads, buttons, microphones, and touch screens, and/or one or more output devices such as speakers and display devices. The power supply 3600 supplies an operating voltage of the client or the server 3000.

The homomorphic encryption and decryption device 3200 may perform at least one of the above-described the homomorphic encryption, the homomorphic decryption and the homomorphic operation with reference to FIGS. 1, 6, 9 and 10.

Figure 13:
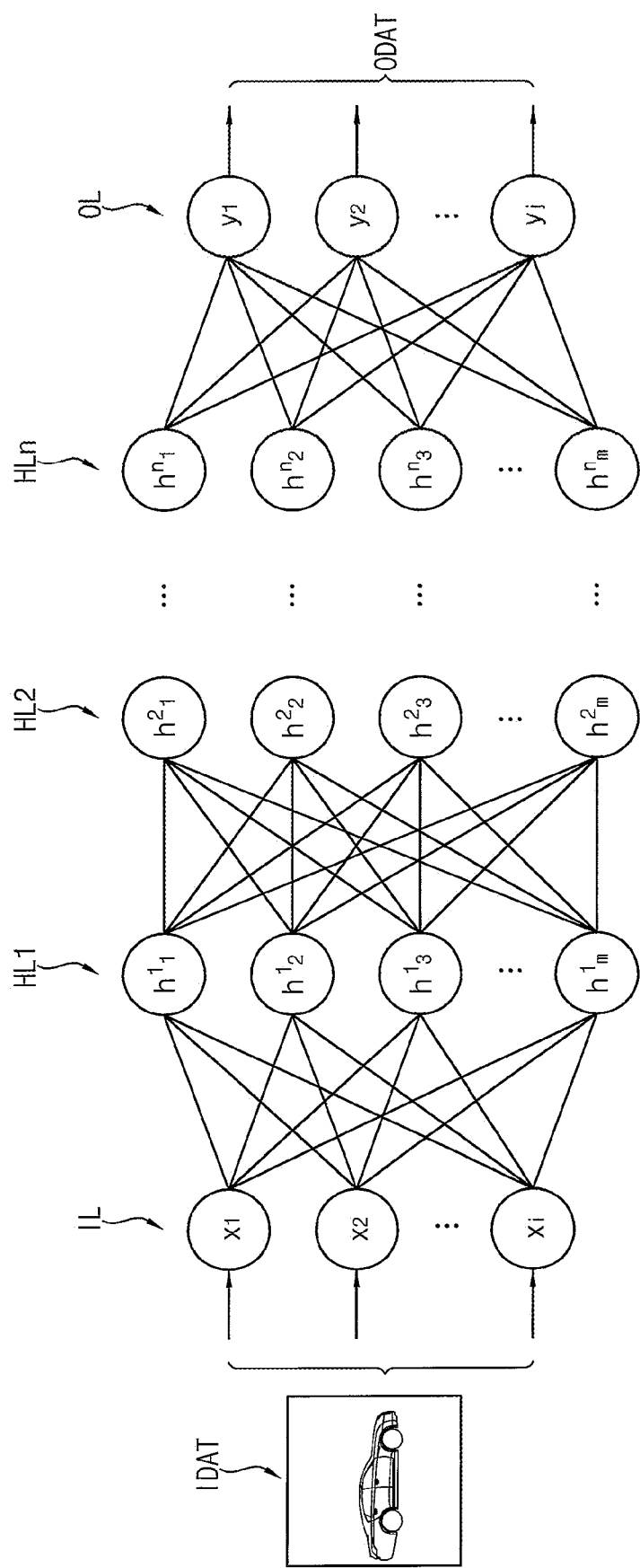
FIGS. 13, 14 and 15 are diagrams for describing an example of a network structure used for a deep learning performed by a homomorphic encryption processing device according to some example embodiments.
Figure 14:
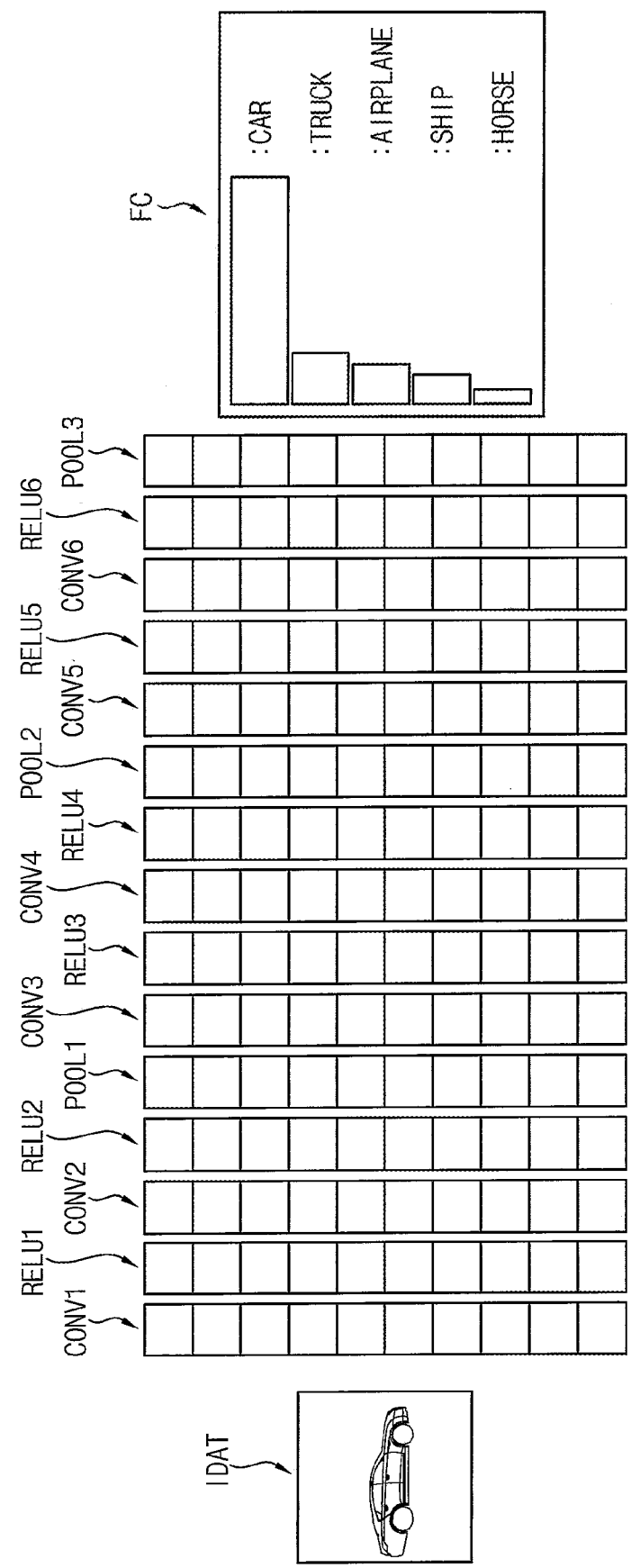
Figure 15:
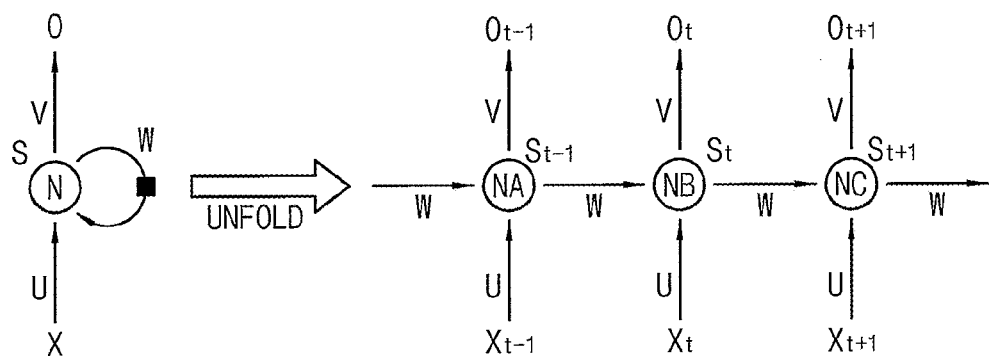

FIGS. 13, 14 and 15 are diagrams for describing an example of a network structure used for a deep learning performed by a homomorphic encryption processing device according to some example embodiments.

Referring to FIG. 13, a general neural network (e.g., an ANN) may include an input layer IL, a plurality of hidden layers HL1, HL2, HLn and an output layer OL.

The input layer IL may include i input nodes $x_1$, $x_2$, ..., $x_i$, where i is a natural number. Input data (e.g., vector input data) IDAT whose length is i may be input to the input nodes $x_1$, $x_2$, ..., $x_i$ such that each element of the input data IDAT is input to a respective one of the input nodes $x_1$, $x_2$, ..., $x_i$.

The plurality of hidden layers HL1, HL2, ..., HLn may include n hidden layers, where n is a natural number, and may include a plurality of hidden nodes $h^1_1$, $h^1_2$, $h^1_3$, ..., $h^1_m$, $h^2_1$, $h^2_2$, $h^2_3$, $h^2_m$, $h''_1$, $h''_2$, $h''_3$, ..., $h''_m$. For example, the hidden layer HL1 may include m hidden nodes $h^1_1$, $h^1_2$, $h^1_3$, ..., $h^1_m$, the hidden layer HL2 may include m hidden nodes $h^2_1$, $h^2_2$, $h^2_3$, ..., $h^2_m$, and the hidden layer HLn may include m hidden nodes $h''_1$, $h''_2$, $h''_3$, ..., $h''_m$, where m is a natural number.

The output layer OL may include j output nodes $y_1$, $y_2$, ..., $y_j$, where j is a natural number. Each of the output nodes $y_1$, $y_2$, ..., $y_j$ may correspond to a respective one of classes to be categorized. The output layer OL may output output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 13 may be represented by information on branches (or connections) between nodes illustrated as lines, and a weighted value assigned to each branch, which is not illustrated.

Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 13 may not be suitable for handling input image data (or input sound data) because each node (e.g., the node $h^1_1$) is connected to all nodes of a previous layer (e.g., the nodes $x_1$, $x_2$, ..., $x_i$ included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the CNN.

Referring to FIG. 14, a CNN may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the CNN may have three dimensions of width, height and depth, and thus data that is input to each layer may be volume data having three dimensions of width, height and depth. For example, if an input image in FIG. 14 has a size of 32 widths (e.g., 32 pixels) and 32 heights and three color channels R, G and B, input data IDAT corresponding to the input image may have a size of 32*32*3. The input data IDAT in FIG. 14 may be referred to as input volume data or input activation volume.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

For example, parameters of each convolutional layer may consist of a set of learnable filters. Every filter may be small spatially (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of RELU layers RELU1, RELU2, RELU3, RELU4, RELU5 and RELU6 may perform a rectified linear unit (RELU) operation that corresponds to an activation function defined by, e.g., a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOL3 may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the CNN, pairs of the CONV/RELU layers may be repeatedly arranged in the CNN, and the pooling layer may be periodically inserted in the CNN, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into an one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

The types and number of layers included in the CNN may not be limited to an example described with reference to FIG. 14 and may be changed according to example embodiments. In addition, although not illustrated in FIG. 14, the CNN may further include other layers such as a softmax layer for converting score values corresponding to predicted results into probability values, a bias adding layer for adding at least one bias, or the like.

Referring to FIG. 15, a recurrent neural network (RNN) may include a repeating structure using a specific node or cell N illustrated on the left side of FIG. 15.

A structure illustrated on the right side of FIG. 15 may represent that a recurrent connection of the RNN illustrated on the left side is unfolded (or unrolled). The term "unfolded" means that the network is written out or illustrated for the complete or entire sequence including all nodes NA, NB and NC. For example, if the sequence of interest is a sentence of 3 words, the RNN may be unfolded into a 3-layer neural network, one layer for each word (e.g., without recurrent connections or without cycles).

In the RNN in FIG. 15, X represents an input of the RNN. For example, $X_t$ may be an input at time step t, and $X_{t-1}$ and $X_{t+1}$ may be inputs at time steps t−1 and t+1, respectively.

In the RNN in FIG. 15, S represents a hidden state. For example, $S_t$ may be a hidden state at the time step t, and $S_{t-1}$ and $S_{t+1}$ may be hidden states at the time steps t−1 and t+1, respectively. The hidden state may be calculated based on a previous hidden state and an input at a current step. For example, $S_t=f(UX_t+WS_{t-1})$. For example, the function f may be usually a nonlinearity function such as tanh or RELU. $S_{-1}$, which is required to calculate a first hidden state, may be typically initialized to all zeroes.

In the RNN in FIG. 15, O represents an output of the RNN. For example, $O_t$ may be an output at the time step t, and $O_{t-1}$ and $O_{t+1}$ may be outputs at the time steps t−1 and t+1, respectively. For example, if it is required to predict a next word in a sentence, it would be a vector of probabilities across a vocabulary. For example, $O_t=\text{softmax}(VS_t)$.

In the RNN in FIG. 15, the hidden state may be a "memory" of the network. In other words, the RNN may have a "memory" which captures information about what has been calculated so far. The hidden state $S_t$ may capture information about what happened in all the previous time steps. The output $O_t$ may be calculated solely based on the memory at the current time step t. In addition, unlike a traditional neural network, which uses different parameters at each layer, the RNN may share the same parameters (e.g., U, V and W in FIG. 13) across all time steps. This may represent the fact that the same task may be performed at each step, just with different inputs. This may greatly reduce the total number of parameters required to be trained or learned.

The network structure used for deep learning may utilize a variety of other artificial neural network organizational and processing models, such as deconvolutional neural networks, recurrent neural networks (RNN) including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

Alternatively or additionally, such network structures may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by electronic devices.

In some example embodiments, at least one of various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by the neural network system described with reference to FIGS. 13, 14 and 15.

Figure 16:
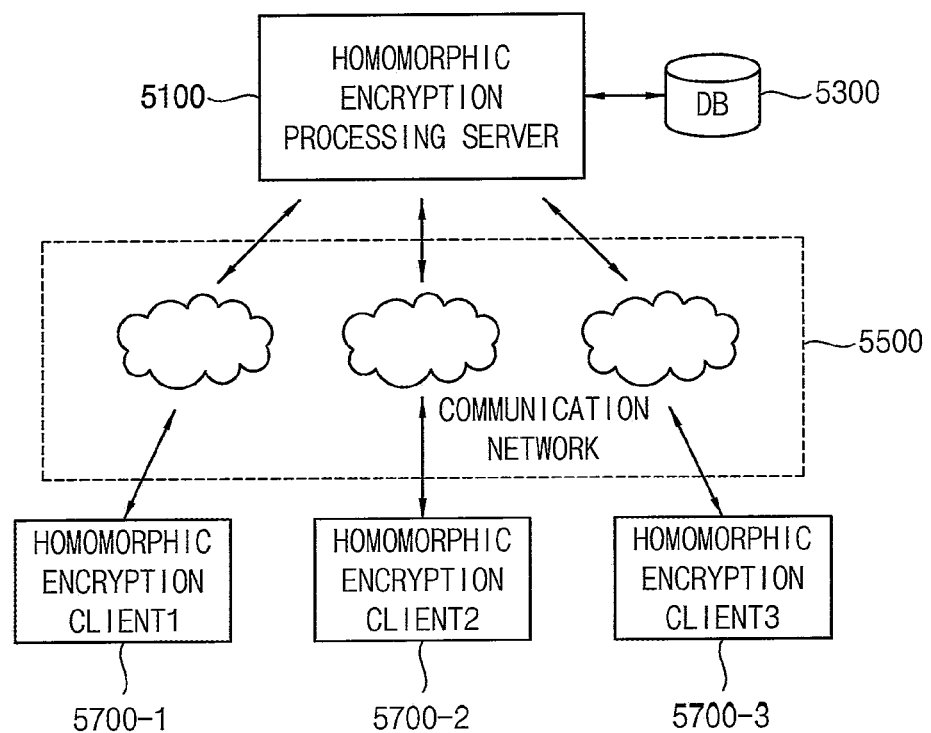
FIG. 16 is a block diagram illustrating a system including a homomorphic encryption processing device according to some example embodiments.

FIG. 16 is a block diagram illustrating a system including a homomorphic encryption processing device according to some example embodiments.

Referring to FIG. 16, a homomorphic encryption system 5000 includes a homomorphic encryption processing server 5100, a database 5300, a communication network 5500 and/or one or more homomorphic encryption clients 5700-1, 5700-2 and 5700-3.

At least one of the homomorphic encryption processing server 5100 and the homomorphic encryption clients may include one of the above-described homomorphic encryption processing devices 1000, 1000a, 10000b and 1000c with reference to FIGS. 1, 6, 9 and 10.

The homomorphic encryption clients 5700-1, 5700-2 and 5700-3 are computing devices or communication terminals having a communication function, and may be mobile phones, smart phones, tablet PCs, mobile internet devices MIDs, internet tablets, and IoT (Internet of Things) device, or a wearable computer, but the scope of the present inventive concepts is not limited thereto.

The communication network 5500 includes a local area network LAN, a wide area network WAN, an Internet WWW, a wired/wireless data communication network, a telephone network, a wired/wireless television communication network, and the like.

The wireless communication network may be one of a 3G, a 4G, a 5G, a 3GPP (3rd Generation Partnership Project), a LTE (Long Term Evolution), a WIMAX (World Interoperability for Microwave Access), a WiFi, a Bluetooth communication, an infrared communication, an ultrasonic communication, a Visible Light Communication VLC and a Li-Fi, but the scope of the present inventive concepts is not limited thereto.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described above, a homomorphic encryption processing device, a system including the homomorphic encryption processing device and a method of performing a homomorphic encryption processing according to example embodiments of the present inventive concepts may adaptively generate a homomorphic encryption parameter according to a ciphertext operation level information determined based on a field information, and may perform a homomorphic encryption, a homomorphic decryption and a homomorphic operation based on the homomorphic encryption parameter. Accordingly, the homomorphic encryption processing device, the system including the homomorphic encryption processing device and the method of performing the homomorphic encryption processing may adaptively perform the homomorphic encryption, the homomorphic decryption and the homomorphic operation in consideration of the field information.

The inventive concepts may be applied to various application fields to which a homomorphic encryption technology is applied. For example, the inventive concepts may be applied to systems to which a homomorphic encryption technology is applied, such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A homomorphic encryption processing device comprising:
   processing circuitry configured to
      generate ciphertext operation level information based on field information, the field information representing a technology field to which homomorphic encryption processing is applied, the ciphertext operation level information representing a maximum number of multiplication operations between homomorphic ciphertexts without a bootstrapping process;
      select and output a homomorphic encryption parameter based on the ciphertext operation level information; and
      perform one of a homomorphic encryption, a homomorphic decryption and a homomorphic operation, based on the homomorphic encryption parameter,
   wherein the field information corresponds to one of a plurality of technology fields, and the plurality of technology fields are classified according to a size of an amount of computational quantity of the homomorphic operation.

2. The homomorphic encryption processing device of claim 1, wherein when a value of a ciphertext operation level included in the ciphertext operation level information increases, performance of the homomorphic operation increases, a size of a ciphertext generated by the homomorphic encryption and a computational complexity of the homomorphic operation increase.

3. The homomorphic encryption processing device of claim 1, wherein the processing circuitry is further configured to receive a plaintext, and generates a homomorphic ciphertext by encrypting the plaintext based on the homomorphic encryption parameter.

4. The homomorphic encryption processing device of claim 1, wherein the plurality of technology fields include a first field, a second field and a third field, and
   wherein the processing circuitry is further configured to perform only homomorphic operations of arithmetic operations with respect to the first field, further configured to perform homomorphic operations of exponential and logarithmic operations with respect to the second field, and further configured to perform homomorphic operations of a derivative operation with respect to the third field.

5. The homomorphic encryption processing device of claim 4, wherein the first field represents a technology field related to a data search or a data evaluation, the second field represents a technology field related to a data analysis, and the third field represents a technology field related to a machine learning.

6. The homomorphic encryption processing device of claim 1, wherein when a number of the plurality of technology fields corresponding to a plurality of parameters stored in the processing circuitry is equal to a number of ciphertext operation levels included in the ciphertext operation level information, each of the plurality of technology fields and each of the ciphertext operation levels are matched one-to-one.

7. The homomorphic encryption processing device of claim 1, wherein the processing circuitry is further configured to
receive the field information and store the field information; and
receive the field information, and
generate the ciphertext operation level information based on the field information.

8. The homomorphic encryption processing device of claim 1, wherein the processing circuitry is further configured to
receive the ciphertext operation level information and output a ciphertext operation level based on the ciphertext operation level information;
store a plurality of parameters corresponding to a plurality of technology fields, respectively; and
select a portion of the plurality of parameters based on the ciphertext operation level and output the selected parameters as the homomorphic encryption parameter.

9. The homomorphic encryption processing device of claim 1, wherein the processing circuitry is further configured to receive a plaintext and operation mode information, and is further configure to perform one of the homomorphic encryption, the homomorphic decryption and the homomorphic operation based on the plaintext and the operation mode information.

10. The homomorphic encryption processing device of claim 1, wherein the processing circuitry includes an encryption unit and the encryption unit includes an encoder, polynomial multipliers, a Gaussian sampler and polynomial adders.

11. The homomorphic encryption processing device of claim 1, wherein the processing circuitry includes parameters related to public keys, a standard deviation of a Gaussian sampler and a prime number for encoding.

12. The homomorphic encryption processing device of claim 1, wherein the processing circuitry is further configured to receive the field information and determine and output security level information based on the field information.

13. The homomorphic encryption processing device of claim 12, wherein when a number of a plurality of technology fields corresponding to a plurality of parameters stored in the processing circuitry is equal to a number of security levels included in the security level information, each of the plurality of technology fields and each of the security levels are matched one-to-one.

14. The homomorphic encryption processing device of claim 1, wherein the field information further corresponds to at least one industry selected from an information industry, a communication industry, a finance industry an insurance industry, a transportation industry, a warehousing industry, a service industry, and a healthcare industry.

15. A method of performing homomorphic encryption processing, the method comprising:
receiving field information representing a technology field to which homomorphic encryption processing is applied;
generating ciphertext operation level information representing a maximum number of multiplication operations between homomorphic ciphertexts without a bootstrapping process;
selecting a homomorphic encryption parameter based on the ciphertext operation level information; and
performing one of a homomorphic encryption, a homomorphic decryption and a homomorphic operation, based on the homomorphic encryption parameter,
wherein the field information corresponds to one of a plurality of technology fields, and the plurality of technology fields are classified according to a size of an amount of computational quantity of the homomorphic operation.

16. The method of claim 15, wherein when a value of a ciphertext operation level included in the ciphertext operation level information increases, performance of the homomorphic operation, a size of a ciphertext generated by the homomorphic encryption and a computational complexity of the homomorphic operation increase.

17. The method of claim 15, wherein the field information further corresponds to at least one industry selected from an information industry, a communication industry, a finance industry an insurance industry, a transportation industry, a warehousing industry, a service industry, and a healthcare industry.

18. A homomorphic encryption system comprising:
a homomorphic encryption processing server; and
one or more homomorphic encryption clients configured to request a service to the homomorphic encryption server,
wherein at least one of the homomorphic encryption processing server and the homomorphic encryption clients includes processing circuitry configured to
generate ciphertext operation level information based on field information, the field information representing a technology field to which homomorphic encryption processing is applied, the ciphertext operation level information representing a maximum number of multiplication operations between homomorphic ciphertexts without a bootstrapping process;
select and output a homomorphic encryption parameter based on the ciphertext operation level information; and
perform one of a homomorphic encryption, a homomorphic decryption and a homomorphic operation, based on the homomorphic encryption parameter,
wherein the field information corresponds to one of a plurality of technology fields, and the plurality of technology fields are classified according to a size of an amount of computational quantity of the homomorphic operation.

19. The homomorphic encryption system of claim 18, wherein when a value of a ciphertext operation level included in the ciphertext operation level information increases, performance of the homomorphic operation, a size of a ciphertext generated by the homomorphic encryption and a computational complexity of the homomorphic operation increase.

20. The homomorphic encryption system of claim 18, wherein the field information further corresponds to at least one industry selected from an information industry, a communication industry, a finance industry an insurance industry, a transportation industry, a warehousing industry, a service industry, and a healthcare industry.

* * * * *